C. SKINNER.

CATTLE GUARD.

APPLICATION FILED AUG. 9, 1916.

Reissued Jan. 9, 1917. 14,247.

Inventor

Calvin Skinner

Witnesses

R. M. McCormick

A. L. Phelps

By

C. C. Kiesthead Attorney

THE NORRIS PETERS CO., PHOTO-LITHO., WASHINGTON, D. C.

UNITED STATES PATENT OFFICE.

CALVIN SKINNER, OF COLUMBUS, OHIO.

CATTLE-GUARD.

14,247. Specification of Reissued Letters Patent. Reissued Jan. 9, 1917.

Original No. 1,109,552, dated September 1, 1914, Serial No. 813,565, filed January 21, 1914. Application for reissue filed August 9, 1916. Serial No. 114,067.

*To all whom it may concern:*

Be it known that I, CALVIN SKINNER, a citizen of the United States, residing at Columbus, in the county of Franklin and State of Ohio, have invented certain new and useful Improvements in Cattle-Guards, of which the following is a specification.

My invention relates to cattle guards of the type used in connection with steam or electric railways and usually placed on opposite sides of roads or crossings.

I aim to provide a comparatively simple structure which is easily manufactured and readily set in position.

I also so construct my cattle guard that, by the use of longitudinally extending rollers or guard members, the guard members or the rollers themselves may rotate slowly when stepped upon by any cattle to frighten them away.

Another novel feature of my device resides in the structure used by me for mounting the longitudinally extending rollers in position. This structure comprises means whereby the guard members are permitted to shift toward or away from each other in substantially their own plane and also be engaged at their tops to prevent their removal.

Further, the means of attachment for the ends of the rollers used by me, are identical in structure and are adapted to engage one end of half of the required number of rollers placed between the track rails. By the use of these attaching devices, the number of rollers on the outside portions of the track rails will equal those between the track rails.

Figure 1:
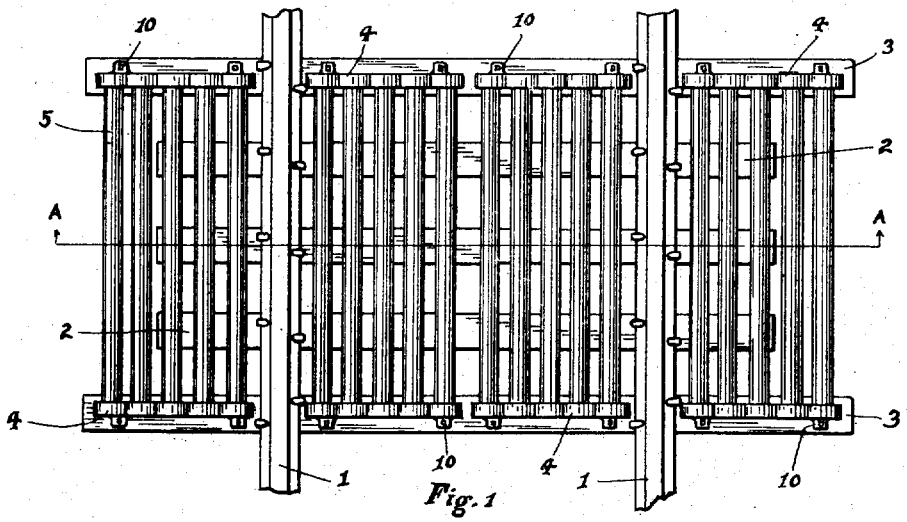
Figure 2:
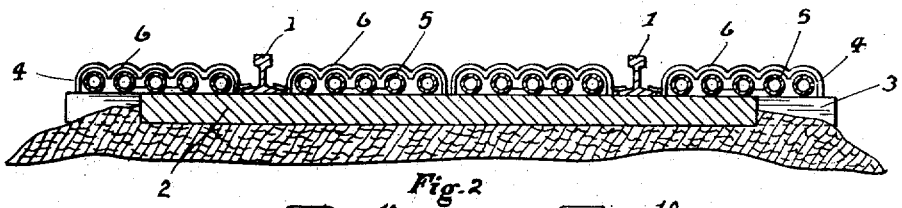
Figure 3:
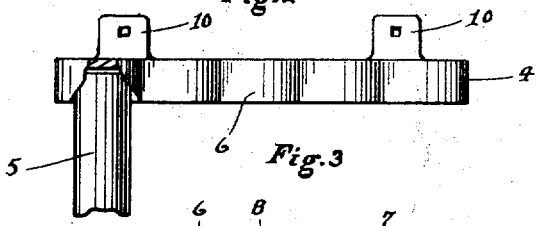
Figure 4:
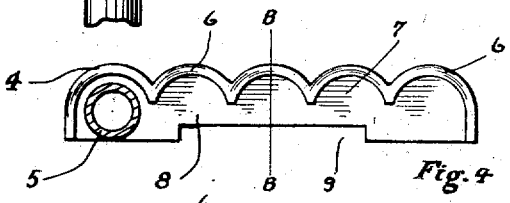
Figure 5:
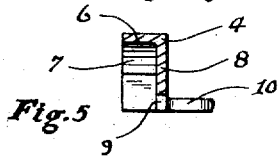

The preferred embodiment of my invention is shown in the accompanying drawings, in which similar characters of reference designate corresponding parts, and in which:

Figure 1 is a top plan view showing a section of two track rails mounted in position with my cattle guards applied thereto, Fig. 2 is a section taken on line A—A of Fig. 1 and looking in the direction of the arrows, Fig. 3 is an enlarged top plan view of one of the fasteners used by me, a portion being broken away and a section of roller applied thereto, Fig. 4 is a front elevation of the structure shown in Fig. 3, and Fig. 5 is a section taken on line B—B of Fig. 4.

My invention is applicable to both steam and electric roads, the track rails being shown at 1 and as securely attached to ordinary ties 2. Cross ties 3 slightly longer than those shown at 2 are provided and determinately spaced from each other to serve as a means of attachment for the attaching members shown at 4. The guard proper consists of a plurality of rollers 5 definitely spaced upon the outside portions of the track rails and between such track rails. In the present instance, these guard members take the form of pipe sections adapted to rest directly upon the upper surface of the larger cross ties 3 and held in their respective positions by the flange 6, forming the upper wall of the attaching units. Reference to the drawings will show that this flange 6 is provided with a plurality of semi-circular portions as shown at 7, which portions are adapted to loosely fit the upper portions of the pipe sections. This loose fit, as is shown particularly in Fig. 4, permits of a lateral shifting as well as a rotative movement of the pipe sections when cattle or the like step on them and it is these movements which frighten the cattle. The side walls 8 of these attaching units project downward to lie flush with the upper surface of the cross ties 3, with the exception of a small portion cut out at 9, which cut-out portions are provided to remove any dirt, etc., that may collect at this point and also to decrease the cost of manufacture. The attaching units themselves are held in position by passing a spike through the apertured ears, as shown at 10.

It will be noted that the attaching members 4 are of a length to require two for each cross tie 3 to form a symmetrical spacing between the track rails and that one each is provided along the outside portion of the track rails. By adopting this scheme, the attaching units themselves are all of an identical structure and are, therefore, readily interchangeable and may be readily replaced. It will further be noted by reference to Fig. 4, that the semi-circular portions 7 are of a diameter somewhat larger than the diameter of the pipe sections 5. I have provided this structure to positively guard against any binding of the members upon the pipe sections themselves, to prevent their rotation and consequent lateral shifting. Also, by allowing the pipe sections to bear directly upon the top faces of the cross ties 3, it is only necessary that this upper flange carry the semi-circular formations and because of their bearing directly upon the cross ties, they are less apt to become rusted in position.

What I claim, is:

1. A cattle guard comprising, in combination with suitable cross ties, a plurality of longitudinally extending guard members spanning the distance between said cross ties, and end attaching means for said guard members comprising upstanding walls adapted to limit the longitudinal movement of said members and overhanging top walls loosely engaging the tops of said members adjacent their ends to permit their shifting movement toward or away from each other.

2. A cattle guard comprising, in combination with suitable cross ties, a plurality of longitudinally extending guard members spanning the distance between said cross ties, and a plurality of end pieces arranged to limit the longitudinal movement of said members and provided with laterally projecting flanges to loosely engage the tops of said members to prevent their removal and formed to permit movement of said members toward or away from each other in substantially their own plane.

3. A cattle guard comprising, in combination with suitable cross ties, a plurality of longitudinally extending roller members spanning the distance between said cross ties, and a plurality of end pieces arranged to limit the longitudinal movement of said members and provided with laterally projecting semi-circularly shaped flanges for engaging the tops of said members, said flanges loosely engaging the tops of said members to permit of a limited rolling movement toward or away from each other.

4. A cattle guard comprising, in combination with suitable cross ties, a plurality of longitudinally extending rollers spanning the distance between said cross ties, and a plurality of end pieces engaging the top, sides and ends of said rollers, said end pieces being formed on their upper sides with semi-circular flange portions to loosely fit said rollers, the lower sides of said rollers lying directly upon the upper sides of said cross ties.

5. A cattle guard comprising, in combination with suitable cross ties, a plurality of longitudinally extending pipe sections spanning the distance between and lying directly upon said cross ties, and a plurality of end pieces of identical structure and of a length to engage half the required number of rollers between the track rails, said end pieces being disposed between and upon each side of the track rails, said end pieces being formed on their upper sides with semi-circular flange portions to loosely fit said rollers to permit their rotation.

CALVIN SKINNER.

Witnesses:
WALTER E. L. BOCK,
A. L. PHELPS.

Copies of this patent may be obtained for five cents each, by addressing the "Commissioner of Patents, Washington, D. C."